United States Patent
Petzold et al.

(10) Patent No.: US 8,083,044 B2
(45) Date of Patent: Dec. 27, 2011

(54) CLUTCH ACTUATOR AND METHOD FOR ACTUATING A CLUTCH

(75) Inventors: Rainer Petzold, Friedrichshafen (DE); Franz Bitzer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 554 days.

(21) Appl. No.: 12/300,886

(22) PCT Filed: Apr. 25, 2007

(86) PCT No.: PCT/EP2007/054023
§ 371 (c)(1),
(2), (4) Date: Nov. 14, 2008

(87) PCT Pub. No.: WO2007/134938
PCT Pub. Date: Nov. 29, 2007

(65) Prior Publication Data
US 2009/0192016 A1    Jul. 30, 2009

(30) Foreign Application Priority Data

May 23, 2006  (DE) .......................... 10 2006 024 010

(51) Int. Cl.
*F16D 48/06* (2006.01)
(52) U.S. Cl. .............. 192/85.56; 192/85.62; 192/111.12
(58) Field of Classification Search ............... 192/85.56, 192/85.62, 111.12
See application file for complete search history.

(56) References Cited

U.S. PATENT DOCUMENTS

| 3,489,257 | A | * | 1/1970 | Nakano .................... 192/70.252 |
| 5,029,678 | A | * | 7/1991 | Koshizawa .................... 192/76 |
| 5,474,165 | A | | 12/1995 | Doremus |
| 6,827,194 | B2 | | 12/2004 | Steinel et al. |
| 7,008,349 | B2 | | 3/2006 | Zimmermann et al. |
| 7,032,730 | B2 | | 4/2006 | Härdtle |

FOREIGN PATENT DOCUMENTS

| DE | 41 20 643 A1 | 12/1992 |
| DE | 44 01 030 A1 | 8/1994 |
| DE | 100 05 086 A1 | 8/2001 |
| DE | 102 36 881 A1 | 2/2003 |
| EP | 1 367 283 A1 | 12/2003 |
| FR | 2 828 535 | 2/2003 |
| WO | WO-03/019026 A1 | 3/2003 |

\* cited by examiner

*Primary Examiner* — Richard M. Lorence
(74) *Attorney, Agent, or Firm* — Davis & Bujold, P.L.L.C.

(57) ABSTRACT

A clutch actuator (6), as well as a method for operating a clutch (3), between the drive motor and the transmission (1) of a motor vehicle. The clutch actuator includes a cylinder with a piston (14) and an actuator (15), such that a clutch release bearing (4), arranged co-axially to the central axis of the clutch, may be operated to apply an axial pre-tensioning force on the clutch release bearing and conduct an operating medium into the clutch actuator for axially displacing the piston and/or the clutch release bearing. To simplify a clutch actuator of this type and enhance its utilization, the clutch actuator is configured and used for generating the pre-tensioning force.

12 Claims, 1 Drawing Sheet

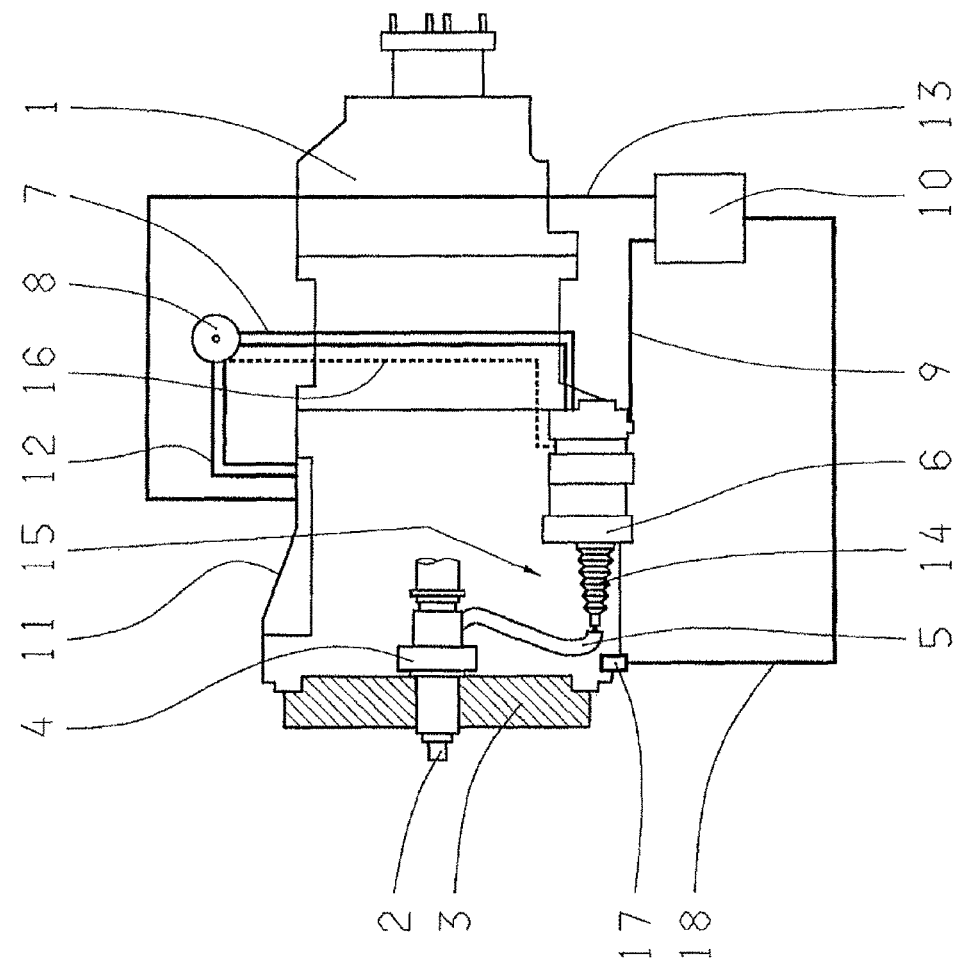

8,083,044 B2

CLUTCH ACTUATOR AND METHOD FOR ACTUATING A CLUTCH

This application is a national stage completion of PCT/EP2007/054023 filed Apr. 25, 2007, which claims priority from German Application Serial No. 10 2006 024 010.3 filed May 23, 2006.

FIELD OF THE INVENTION

The present invention relates to clutch actuator, as well as to a method for controlling a clutch actuator.

BACKGROUND OF THE INVENTION

Disengaging and/or releasing a clutch arranged in a power train may be achieved by way of a clutch actuator arranged on a clutch bell, where the clutch actuator works electrically, pneumatically or hydraulically and serves as the axial displacement of a clutch release bearing. A pneumatically operated clutch plate of this type is known from DE 100 05 086 A1 by the Applicant.

In hydraulic or pneumatic clutch actuator, the clutch actuator essentially comprises a cylinder housing, a piston with a seal, a preload spring and, if necessary, a venting screw. The preload spring provides that a minor shift force is always present on the clutch release bearing when the clutch actuator is vented and/or depressurized. This way, a breakdown of the lubricating oil film in the shift bearing can be prevented, the life of the clutch release is increased and disturbing noises are avoided.

The use of a preload spring and/or pretensioning spring of this type has the disadvantage that their spring force varies depending on the clutch release path. Thus, the pretensioning force changes subject to the wear of the clutch linings which, considering the entire life of the clutch, causes inconsistent and undesired system behavior.

A further disadvantage of using a pretensioning spring in clutch actuator is that a frequently desired and adjusted stronger pretensioning force often causes micromovements in the clutch actuator itself when the clutch is engaged. This is because in the coupled state, when the clutch actuator is depressurized, vibrations of the motor are transmitted to the clutch release cylinders with a higher pretensioning force. This causes very small movements in the clutch actuator which, in turn, cause a premature wear of the clutch actuator.

Nevertheless, micromovements in the clutch release mechanism may be quite practical, namely to minimize the effects of friction of the clutch release mechanism on the clutch control. However, such micromovements are not necessary and are rather harmful in the coupled state.

Against this background, it is the object of the present invention to improve a clutch actuator of the above mentioned type, such that it overcomes the described disadvantages and also preferably consists of as few components as possible.

SUMMARY OF THE INVENTION

The present invention is based on the knowledge that the object of the present invention may be attained in a surprisingly simple manner in that a pretensioning spring is dispensed with and the necessary pretensioning force is generated by the operating medium of the clutch actuator.

Surprising effects and advantages arise from this. Since the pretensioning force is not applied, as has been usual, by a spring, the pretensioning force may be variably adjusted. Further, the pretensioning force no longer depends on the wear conditions of the clutch linings. Moreover, the costs of the assembly and possibly necessary replacement of the pretensioning spring are omitted.

Eventually, micromovements in the clutch plate may now be specifically reduced to a minimum and/or it is now possible to generate specific and need-based micromovements in the clutch release system at certain operating stages of the power train. As a result of this, friction effects on the clutch release mechanism may be reduced and the performance of the clutch operation increased. Finally, compared to traditional solutions, it is possible by way of the embodiment of a clutch actuator to adjust reduced pretensioning forces so that the effects of the micromovements do not reach the clutch actuator.

Thus, the present invention is derived from a clutch actuator for operating a clutch between the drive motor and the transmission of a motor vehicle, a commercial vehicle, where the clutch actuator exhibits a cylinder with a piston and an actuator, such that a clutch release bearing arranged co-axially to the central axis of the clutch may be operated, where an axial pretensioning force is applied to the clutch release bearing and an operating medium is fed into the clutch actuator for the axial displacement of the piston and/or clutch release bearing. In order to solve the above object of the present invention, it is further provided that the clutch actuator is configured for generating the pretensioning force as a result of which the pretensioning springs may be dispensed with.

According to a further embodiment of the present invention, it is provided that the clutch actuator is connected to a reservoir for the operating medium via a connection line.

It may, however, also be provided that the clutch actuator is connected to the reservoir for the operating medium via the connection line and an additional line. If both pipes feed operating medium into the clutch actuator at different ends of the piston, a specifically controlled reciprocating movement of the piston may be generated.

For control purposes, the clutch actuator is connected to an electronic control device via electrical signals, such that the supply of operating medium into the clutch actuator may be regulated subject to the degree of the pretensioning force required depending on the operating situation and/or subject to the required operating pressure for operating the clutch release bearing and/or clutch.

In order to facilitate the control and regulation of the clutch actuator, it is provided that at least a travel or force sensor for recording the actual extent of the travel distance or of the operating force of the release clutch bearing operation is available and connected by way of electrical signals to the electronic control device.

Especially preferred is an embodiment in which the operating medium is air. That is especially so, because the clutch actuator may preferably be used in clutches of commercial vehicles in which pneumatic connections and reservoirs are available by default. However, in line with the present invention the operating medium may also be a hydraulic fluid.

In a further advantageous embodiment of the present invention, it is provided that the clutch actuator is arranged eccentrically to the central axis of the clutch or, alternatively, that the clutch actuator is arranged concentrically to the central axis of the clutch.

The present invention also relates to a method for controlling a clutch actuator with a cylinder, a piston and an actuator for operating a clutch between the drive motor and the transmission of a motor vehicle in which a clutch release bearing positioned co-axially to the central axis may be operated by the actuator in which a pretensioning force is applied to the clutch release bearing and in which an operating medium is fed into the clutch actuator for the displacement of the piston and/or the clutch release bearing. In order to achieve the above object of the present invention, it is provided that the clutch actuator is used for generating the pretensioning force.

In this connection, it is advantageous if the operating medium for generating the pretensioning force is fed into the clutch actuator from a reservoir via a connection line.

Alternatively, it may be provided that the operating medium for producing the pretensioning force is fed from the reservoir into the clutch actuator, via an additional line, so that the piston of the clutch actuator may be pressurized on both sides.

A further embodiment of the method provides that an electronic control device regulates the feed of the operating medium into the clutch actuator subject to the degree of pretensioning force required, depending on the operating situation, and/or subject to the operating pressure required for operating the clutch release bearing and/or clutch.

In this connection, it is advantageous that the electronic control device regulates the pretensioning force on the basis of the actual extent of the clutch release bearing operation by way of at least one sensor which provides the control device with the respective sensor signals. A force or travel sensor is used as a sensor in this connection.

Further, in the context of additional embodiments of the procedure, it is convenient if air or hydraulic fluid is used as an operating medium.

Finally, in a very particularly preferred further embodiment of the method, it is provided that the pretensioning force is regulated by the clutch actuator, such that micromovements are generated in the clutch release mechanism when the clutch is disengaged.

BRIEF DESCRIPTION OF THE DRAWINGS

The invention will now be described, by way of example, with reference to the accompanying drawings in which:

The sole FIGURE shows a schematic diagram of a transmission with an exemplary embodiment of a clutch actuator for a vehicle that is not shown in the drawing, according to the present invention.

DETAILED DESCRIPTION OF THE INVENTION

Accordingly, a FIGURE shows a schematic diagram of a transmission 1 with an exemplary embodiment of a clutch actuator 6. A clutch 3 is arranged on the input shaft 2 of the transmission 1 so that the clutch 3 may be placed by a clutch release bearing 4, mounted on the input shaft 2, into a disengaged and an engaged state with the flywheel of the drive motor of the vehicle (not illustrated in the drawing). A lever 5 meshes with a clutch release bearing 4 and is operated by the clutch actuator 6. A connection line 7 is attached to the clutch actuator 6, which connects the dutch actuator 6 to a reservoir 8 for the operating medium of the clutch actuator 6. An electrical connection line 9 connects the clutch actuator 6 to an electronic control device 10. This control device 10 may also be the main computer of the vehicle or the transmission control.

A transmission control 11, operating with a pressure medium, is arranged in the transmission 1, which is connected to the reservoir 8 for the operating medium and/or pressure medium, via a line 12, and connected to the control device 10, via an electrical line 13.

Together with a piston 14 mounted so as to displace in the clutch actuator 6, the lever 5 forms an actuator 15, such that the clutch release bearing 4 may be displaced axially for switching the clutch 3. A pretensioning force is adjacent the actuator 15 in the clutch release direction, which is permanently transferred to the clutch release bearing 4.

This pretensioning force is not generated by a pretensioned spring, but by an operating medium, which is fed from the reservoir 8 into the clutch actuator 6, via the connection line 7. The operating medium may also be conveyed into the clutch actuator 6 via an indicated additional line 16.

The control device 10 causes the operating medium to be fed into the clutch actuator 6, namely as a dependency of the degree of the required pretensioning force, as well as a dependency of the required operating pressure, when the clutch release bearing 4 is operated. For this purpose, the clutch release bearing 4 and/or the actuator 15 is connected in a sensing manner to a sensor 17, which is configured as a travel sensor or force sensor. The information, determined by the sensor 17, is conveyed to the control device 10 via a sensing line 18, for the generation and transmission of control signals for the clutch actuator 6, which also adjusts the desired pretensioning force at the clutch release bearing 4 subject to the operating situation.

In this graphic illustration of the exemplary embodiment, the clutch actuator 6 is positioned on the transmission 1 eccentrically to the input shaft 2, which forms the central axis of clutch 3. However, in contrast to the shown exemplary embodiment, it is also possible to arrange the clutch actuator 6 concentrically around the input shaft 2 with a corresponding constructive adaptation. Clutch actuators 6 of this type are known as central clutch releases in reference to their basic function.

The control of the operating medium supply of air to the clutch actuator 6 is carried out as a dependency of the clutch operating procedure as follows.

In the coupled state of the clutch release bearing 4, only a minor pretensioning force is present on the piston 14 and the actuator 15 connected to it. For this purpose, either a small amount of operating medium is fed into the clutch actuator 6, via the connection line 7, or the corresponding amount of operating medium is conveyed, via an additional line 16, into the clutch actuator 6, which is otherwise vented, i.e., depressurized, except for the small amount of operating medium for adjusting the pretension of the clutch release bearing 4. If necessary and with knowledge of the values measured by the sensor 17, this amount of operating medium is reduced or increased by the control device 10, in order to generate micromovements in the clutch release bearing 4.

If the clutch release bearing 4 has to be axially displaced by the actuator 15 to release the clutch 3, the clutch actuator 6 is supplied with a pertinent amount of operating medium so that it may achieve and maintain a corresponding operating force. In this connection, the now required amount of operating medium is added, if necessary, to the operating medium already contained in the clutch actuator 6.

REFERENCE NUMERALS 1 transmission
2 input shaft
3 dutch
4 dutch release bearing
5 lever
6 dutch plate
7 connection line
8 reservoir
9 connection line
10 control device
11 transmission control 12 line
13 line
14 piston
15 actuator
16 additional line
17 sensor
18 sensor line

The invention claimed is:

1. A method of controlling a clutch controller (6) with a cylinder, a piston (14) and an actuator (15) for operation of a clutch (3) located between a drive motor and a transmission (1) of a motor vehicle, the method comprising the steps of:
   operating a clutch release bearing (4), arranged co-axially to a central axis of the clutch (3), via the actuator (15);
   applying and variably adjusting a pre-tensioning force to the clutch release bearing (4);
   directing an operating medium into the clutch controller (6) for axial displacement of at least one of the piston (14) and the clutch release bearing (4); and
   generating and regulating the pre-tensioning force with the clutch controller (6), such that specific and need-based incremental axial movements, relative to a transmission input shaft, are generated in the clutch release bearing (4), when the clutch (3) is disengaged.

2. The method according to claim 1, further comprising the step of directing the operating medium for the generation of the pre-tensioning force from a reservoir (8) into the clutch controller (6) via a connection line (7).

3. The method according to claim 2, further comprising the step of directing the operating medium for the generation of the pre-tensioning force from a reservoir (8) into the clutch controller (6) via an additional line (16).

4. The method according to claim 2, further comprising the step of preventing vibration of a motor from being transmitted to the cylinder by generating axial movement in the clutch release bearing (4) by regulating the pre-tensioning force in the clutch controller (6).

5. The method according to claim 1, further comprising the step of regulating a flow of the operating medium into the clutch controller (6) via an electronic control device (10) subject to at least one of a degree of pre-tensioning force required, depending on an operating situation and an operating pressure required for operating at least one of the clutch release bearing (4) and the clutch (3).

6. The method according to claim 5, further comprising the step of regulating the pre-tensioning force with the electronic control device (10) on a basis of an actual extent of the clutch release bearing operation determined by at least one sensor (17), which provides the control device (10) with sensor signals.

7. The method according to claim 6, further comprising the step of determining the actual extent of the clutch release bearing operation with one of a force sensor (17) or a travel sensor (17).

8. The method according to claim 6, further comprising the step of mounting the at least one sensor (17) adjacent one of the clutch release bearing (4) and the actuator (15).

9. The method according to claim 8, further comprising the step of mounting the at least one sensor (17) separate from the cylinder.

10. The method according to claim 6, further comprising the step of preventing vibrations of a motor from being transmitted to the cylinder by generating axial movement in the clutch release bearing (4) by regulating the pre-tensioning force in the clutch controller (6) based on signals sent from the at least one sensor (17).

11. The method according to claim 1, further comprising the step of utilizing one of air or hydraulic fluid as the operating medium.

12. A method of controlling a clutch controller (6) with a piston (14) and an actuator (15) to operate a clutch (3), which is co-axially located with a clutch release bearing (4) in a motor vehicle between a drive motor and a transmission (1), the method comprising the steps of:
   controlling a flow of an operating medium to the clutch controller (6) with an electronic control device (10) to axially displace the piston (14) and the actuator (15);
   applying an amount of pre-tensioning force on the clutch release bearing (4) via the axial displacement of the piston (14) and the actuator (15) depending on a pressure required to operate at least one of the clutch release bearing (4) and the clutch (3); and
   generating incremental axial movements, relative to a transmission input shaft, in the clutch release bearing (4) by regulating the pre-tensioning force in the clutch controller (6), when the clutch (3) is disengaged.

* * * * *